United States Patent [19]

Menard

[11] 4,142,172
[45] Feb. 27, 1979

[54] EMERGENCY POWER PACK FOR VEHICLE TRAILER LIGHTS

[76] Inventor: Roger Menard, 11 Pauline Dr., Clearfield, Pa. 16830

[21] Appl. No.: 696,267

[22] Filed: Jun. 15, 1976

[51] Int. Cl.² .......................... B60Q 1/00; B60Q 1/46
[52] U.S. Cl. .............................. 340/81 R; 307/10 LS; 307/64; 307/150; 362/183; 340/90
[58] Field of Search .................. 340/81 R, 90, 81 F, 340/84, 87, 114 R, 114 B, 333; 240/7.1C, 8.18, 8.22; 307/64, 150, 10 LS; 362/183, 189, 190, 191

[56] References Cited

U.S. PATENT DOCUMENTS

| 3,063,046 | 11/1962 | Hurst | 340/81 X |
| 3,340,503 | 9/1967 | Johnston | 340/81 R |
| 3,560,923 | 2/1971 | Parkes | 340/81 R |
| 3,694,729 | 9/1972 | Jones | 307/150 |
| 3,963,972 | 6/1976 | Todd | 307/150 |
| 4,017,827 | 4/1977 | Brodesser | 340/81 R |

Primary Examiner—John W. Caldwell, Sr.
Assistant Examiner—Donnie L. Crosland
Attorney, Agent, or Firm—Berman, Aisenberg & Platt

[57] ABSTRACT

A device provided with its own power supply to be hooked up to the lighting system on a vehicle trailer, such as semi-trailers, campers, mobile homes, and the like, for the purpose of flashing all or some trailer lights on and off while the trailer might be left unattended at the side of a road so as to warn passing motorists of its presence. The unit consists of a dry cell battery, a conventional flasher mechanism, an on-off switch, a mounting plate provided integrally with a handle therewith, and a plug adapted to fit a vehicle trailer lighting system. The device is portable and can be easily connected or disconnected to a vehicle trailer so that it can readily be stored in the towing vehicle when not in use or it can be readily relocated from one trailer to another.

3 Claims, 5 Drawing Figures

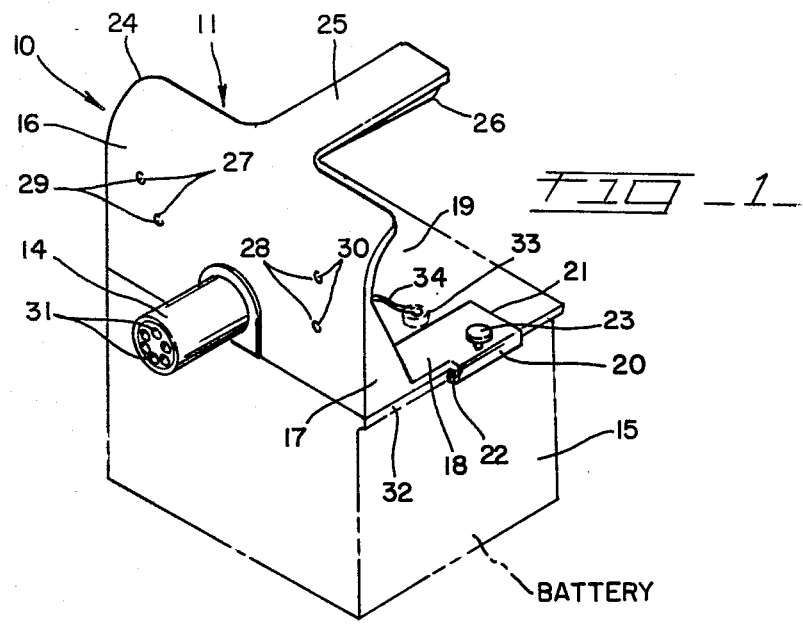
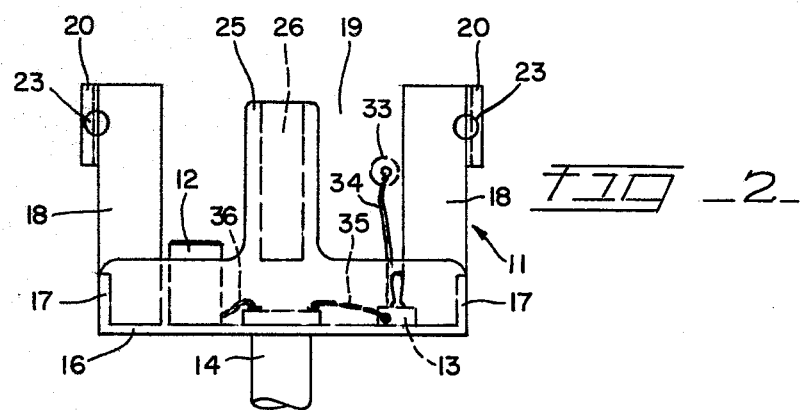
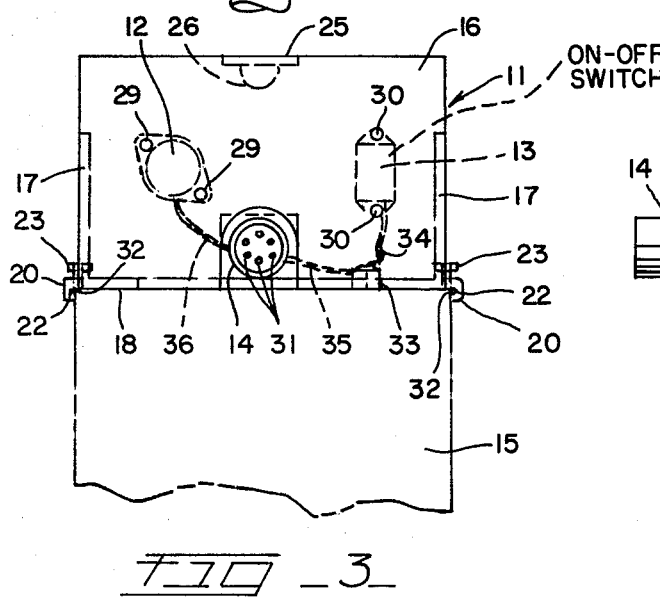
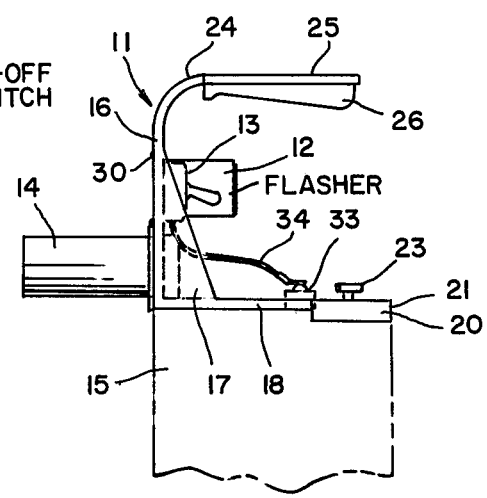

U.S. Patent  Feb. 27, 1979  Sheet 2 of 2  4,142,172
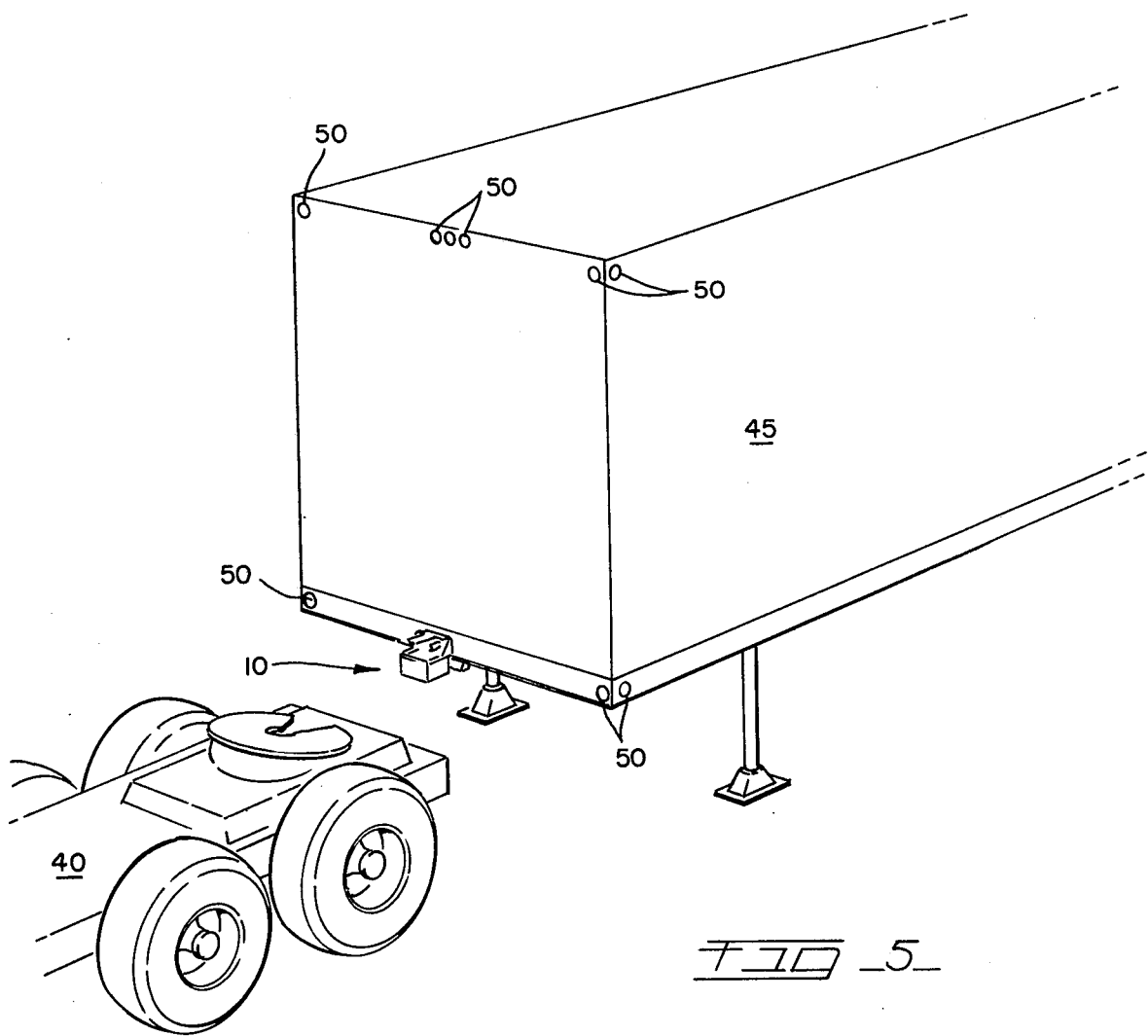
FIG _5_

EMERGENCY POWER PACK FOR VEHICLE TRAILER LIGHTS

BACKGROUND OF THE INVENTION

1. Field of the Invention

This invention relates to an emergency power pack for vehicle trailer lights for activating the lights on a trailer when it is necessary to abandon a trailer on the side of a road so as to warn passing motorists.

2. Description of the Prior Art

The number of motor vehicles utilizing our nation's highways is continually increasing. This increase includes, not only passenger type vehicles, but also trailers that are towed by passenger type vehicles, trucks, and the like, such trailers including semi-trailers, campers, mobile homes, and the like. Concurrent with the increase in the number of such vehicles is an increasing number of accidents, a good number of the accidents being caused as a result of leaving trailers unattended at the side of a road when breakdowns occur. Conventional methods of warning oncoming motorists of the existence of abandoned trailers include the use of ignited flashers, battery operated lights, and the like placed some distance near and behind the abandoned trailer, such systems being unsatisfactory in as much as ignited flashers extinguish after a relatively short period of time or a number of battery operated lights must often be used so that they are inconvenient to transport in the towing vehicle. Trailers abandoned at the side of a road provide an ominous safety threat to other motorists, particularly during bad weather or at night, so that there is an obvious need in the marketplace for a portable self-contained unit that can be readily transported and plugged into the trailer lighting system to flash some or all of the lights on the trailer as a warning to nearby motorists.

SUMMARY OF THE INVENTION

The present invention provides an emergency power pack for vehicle trailer lights for flashing on and off some or all of the lights on a trailer abandoned at the side of a road so as to warn passing motorists of its presence.

It is a feature of the present invention to provide an emergency power pack for vehicle trailer lights.

A further feature of the present invention provides an emergency power pack for vehicle trailer lights which is portable and easy to use and reliable and efficient in operation.

Yet still a further feature of the present invention provides an emergency power pack for vehicle trailer lights which is of a rugged and durable construction and which, therefore, may be guaranteed by the manufacturer to withstand long and continual usage.

An additional feature of the present invention provides an emergency power pack for vehicle trailer lights which is simple in construction and which, therefore, may be produced by a manufacturer at an economical cost so as to encourage widespread usage thereof.

Other features of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the emergency power pack for vehicle trailer lights; and FIG. 2 is a top view of the emergency power pack for vehicle trailer lights; and FIG. 3 is a front sectional view of the emergency power pack for vehicle trailer lights; and FIG. 4 is a side view of the emergency power pack for vehicle trailer lights; and FIG. 5 is a perspective view of the emergency power pack for vehicle trailer lights attached to a semi-trailer.

DESCRIPTION OF THE PREFERRED EMBODIMENT

Referring now to the drawings in detail, there is illustrated a preferred form of the emergency power pack for vehicle trailer lights constructed in accordance with the principles of the present invention and which is designated generally in its entirety by the reference numeral 10 and which is comprised of a mounting plate 11, a conventional flasher unit 12, an on-off switch 13, an adapter plug 14, a battery 15, and associated hardware and interconnecting components as will be later described.

The mounting plate 11 is constructed of durable material with electrical conductance properties, such as steel, and consists of a front wall 16 which is integrally formed on each of its side edges with the side walls 17 which, in turn, are angularly disposed and conjoined thereto and to the outside edges of the two bottom walls 18 which are also integrally joined to the bottom edge of the front wall 16 and are basically rectangular in shape so as to be parallel to each other and extending rearwardly from the front wall 16 to leave an opening 19 therebetween. The outside and rearward edges of the bottom walls 18 are formed into a U-shaped bracket 20 extending a short distance from the rear surface 21 toward the front wall 16 to form an open slot 22 therealong and is further provided with a round threaded through hole (not shown) located centrally along the length of the U-shaped bracket 20 for threadable attachment of a threaded bolt 23 therein. The front wall 16 is curved on its top end as shown by the reference numeral 24 rearwardly and is integrally conjoined along its top edge to the handle 25 disposed centrally along the length of the top surface of the front wall 16 so as to be perpendicular to the front wall 16 and parallel to the bottom walls 18, with the handle 25 being reinforced and to provide a suitable hand grip by means of a semicircular member 26 securely affixed, such as by welding, centrally to the bottom surface of the handle 25. The front wall 16 is further provided with a series of round through holes 27 and 28 for the connecting of components thereto as will be later described.

The flasher unit 12 is a conventional type flasher unit designed to provide electrical current intermittently for flashing lights continuously on and off and is connected to the rear surface of the front wall 16 by means of the rivets 29 through the round through holes 27. The on-off switch 13 is a conventional two pole toggle switch and is connected to the rear surface of the front wall 16 by means of the rivets 30 through the round through holes 28. The adapter plug 14 is cylindrical in configuration and is attached to the front wall 16 in a conventional way, such as by a threaded assembly to a round through hole (not shown) in the front wall 16 so as to protrude outwardly therefrom, with the adapter plug 14 being provided with a series of round female type plugs 31 designed to match the male type plug (not shown) provided on a vehicle trailer for its lighting system.

The battery 15 is a conventional dry cell or wet cell battery designed to provide the voltage and amperage required by a vehicle trailer lights and, as shown in the drawings, is rectangular in configuration having an electrically conductive outside metal surface with a flange 32 being provided along the top edge of two of its sides and a terminal post 33 which is insulated from the outside metal surface of the battery. A length of wire 34 is interconnected in a conventional way, such as by soldering, between the terminal 33 and the on-off switch 13, a length of wire 35 further interconnects the on-off switch 13 with the adapter plug 14, and the length of wire 36 is interconnected between the adapter plug 14 to all or a portion of the plugs 31, as desired to activate flasher lights, directional lights, or all the trailer lights, and the flasher unit 12 to provide positive electrical connections therebetween, with electrical grounding being accomplished by means of the flange 32 contacting the mounting plate 11 within the slot 22 provided on the U-shaped bracket 20.

In operation, the battery 15 is tightly secured to the mounting plate 11 by assembly of the flange 32 within the slot 22 of the U-shaped bracket 20 and by tightening the bolt 23 thereon. When it is necessary to abandon a vehicle trailer on the side of a road, the towing vehicle 40, as shown in FIG. 5, is disconnected from the trailer 45 and the emergency power pack 10 is plugged into the trailer 45 by plugging the adapter plug 14 into the trailer lighting system socket (not shown) conventionally provided on a trailer 45. The emergency power pack 10 is portable and can be readily carried from one place to another by means of the handle 25 provided thereon. To activate the emergency power pack 10, the user turns the on-off switch 13 into the on position so as to provide electrical current from the battery 15 through the flasher unit 12 and the adapter plug 14 to flash all or some of the lights 50 provided on the trailer 45 intermittently on and off. The user can then drive the vehicle 40 away from the trailer 45 to leave all or some of the lights 50 flashing on and off so as to alert passing motorists of the presence of the trailer 45 on the side of the road, with the specific lights left flashing predetermined by the user in the connections made of wire 36 to the specific plugs 31. When the user returns to the trailer 45, the emergency power pack can be readily removed from the trailer 45 and stored within the towing vehicle 40 by reversing the above described procedures.

There is thus provided an emergency power pack for flashing an abandoned vehicle trailer lights which meets all of its stated objectives and which overcomes the disadvantages of existing techniques, thereby providing a safety feature for use on highways applicable to semi-trailers, campers, mobile homes, and the like.

It is to be understood that the form of this invention as shown and described is to be taken as a preferred example thereof, and that this invention is not to be limited to the exact arrangement of parts described in the description or illustrated in the drawings as changes thereto in the details thereof pertaining to size, shape and arrangement of parts thereof are envisioned within the scope of the invention without departing from the novel concepts of the invention.

Having thus described the invention, what is claimed is:

1. An emergency power pack for a vehicle trailer lighting system having male plugs for connection to mating plugs on a tractor, said pack being portable and adapted to be connected to an abandoned vehicle trailer for the purpose of flashing the trailer lights on and off while the trailer is left unattended in order to warn passing motorists, the device comprising, in combination:

a mounting plate comprising a material with electrical conductance properties and consisting of a front wall integrally formed on each of its side edges with angularly disposed side walls and joined to the outside edges of two bottom walls which are substantially rectangular in shape and parallel to each other and extending rearwardly from said front wall to leave an opening therebetween, said bottom walls each having along their outside and rearward edges a U-shaped bracket to form an open slot and provided with a round threaded through hole for receiving a threaded bolt, said front wall of said mounting plate having a curved top end to which is integrally joined a handle disposed centrally along the length of the top surface, said handle being reinforced by means of an affixed semi-circular member to provide a hand grip, said front wall having round through holes for connection of components thereto;

a flasher unit connected to the rear surface of said front wall, an on-off switch connected to the rear surface of said front wall, and adapter plug attached to the front surface of said front wall, said adapter plug having a plurality of round female plugs designed to mate with said male plugs provided on said vehicle trailer; and a conventional battery electrically connected to said flasher unit and said on-off switch and which is rectangular and has an electrically conductive outside metal surface with flanges along the top edge of two of its sides, said flanges being connected to said U-shaped brackets provided in said bottom walls to provide a mechanical and electrical ground connection thereto.

2. An emergency power pack for vehicle trailer lights as set forth in claim 1 wherein said mounting plate comprises a single piece of material with integrally joined walls and surfaces and with said on-off switch, flasher unit, adapter plug, and threaded bolts securely affixed thereto, said mounting plate being securely attached to said battery by means of said threaded bolts to provide an electrical and mechanical connection therebetween.

3. An emergency power pack adapted to be connected to an unhitched trailer of a tractor-trailer of the type which has a multi-conductor plug on said tractor and a mating socket on said trailer to provide an electrical connection therebetween when hitched for controlling the lights on said trailer from a first source of power on said tractor, which comprises:

a mounting plate having a handle integrally formed therein, a multi-conductor adapter plug extending therefrom and adapted to mate with said mating socket on said trailer, and bracket means for supporting a second source of power;

said second source of power comprising a battery coupled to said mounting plate via said bracket means;

switch means mounted on said mounting plate and electrically connected to said battery and said adapter plug for controlling the power therefrom; and flasher means mounted on said mounting plate and electrically connected to said adapter plug for flashing the lights on said trailer when said switch means is turned on and said adapter plug is mated with said socket when said trailer is unhitched from said tractor.

* * * * *